C. BATTLE.
Cotton-Planter.
No. 27,421.
Patented Mar. 13, 1860.
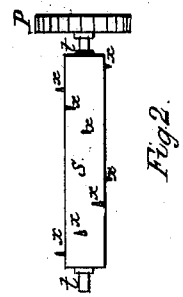
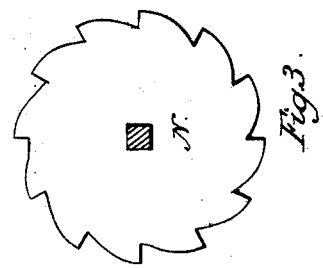
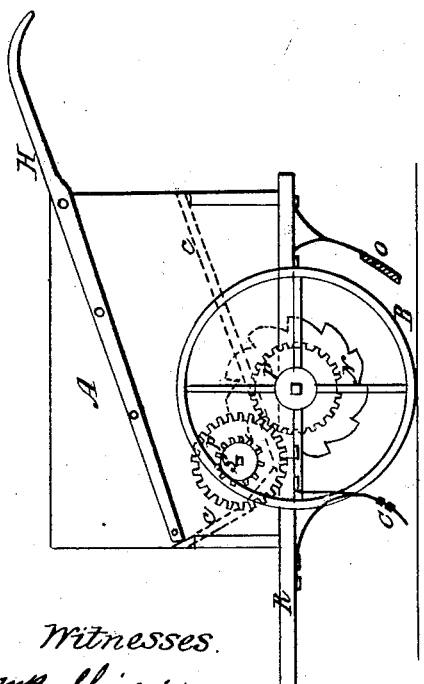
Witnesses
Wm B. Shivers
Robert W. Herbert
Inventor
Curran Battle

UNITED STATES PATENT OFFICE.

CURRAN BATTLE, OF WARRENTON, GEORGIA.

IMPROVEMENT IN COTTON-SEED PLANTERS.

Specification forming part of Letters Patent No. 27,421, dated March 13, 1860.

*To all whom it may concern:*

Be it known that I, CURRAN BATTLE, of Warrenton, in the county of Warren and State of Georgia, have invented a new and Improved Cotton-Planter; and I do hereby declare that the following is a full and exact description thereof, reference being had to the accompanying drawings, and to the letters of reference marked thereon.

To enable others skilled in the art to make and use my invention, I will proceed to describe its construction and operation.

I construct my seed-box in any form needed, usually twice as long as wide, the top being open, the bottom being on such angle that the seed may easily slide to the front of the box, which is of a concave form, so as to bring all the seed under the roller. This box is mounted on wheels the axle of which is attached to the under side of the box. In the center of the box, and placed on the axle, is the saw-toothed feeding-wheel, with such number of teeth as are required to regulate the spaces between the seeds. This saw plays through a slit in the the bottom of the seed-box. In front of this is placed the toothed roller, which keeps the seed loose and gathers them to the front of the saw. The motion of the saw is derived from the carrying-wheels in the forward motion of the machine. The motion of the roller is from two cogged wheels on the outside of the seed-box, one placed on the axle and the other on the end of the shaft of the roller. The saw is made of hard wood. For cotton from one-half to five-eighths of an inch thick, for smaller seeds less thickness, is used. Slides are used on the bottom to suit the thickness of the saw. Immediately in front of the saw, on an arm which projects below the box for seeds and attached to the frame, is a small opening-plow, C, so gaged that it can regulate the depth of the trench, and at the hind end of the same frame is placed the coverer O. This can be made either of wood or iron, at the option of the user. The handles are on the sides and extend far enough in the rear to allow the person using it to have full control of the planter and see into the seed-box. The front of the frame extends far enough in front of the seed-box for the purpose of attaching the horse to the planter.

Figure 1 is a side view of the machine, showing all the parts. A is the seed-box; c c, the inclined bottom and front of the seed-box; R, the frame or bed on which the box rests; H, the handles; B, the wheels of the planter; N, the saw-toothed planting or feed wheel; S, the toothed cylinder or rake to keep the seed loose and bring them in front of the saw; P P, the two cogged wheels, one on the axle of the planter and the other on the shaft of the toothed cylinder; C, the plow to open the trenches; O, the coverer.

Fig. 2 is the toothed cylinder or rake with the pinion cog-wheel; S, the toothed cylinder; x x x, the teeth; P, the pinion cog-wheel; t t, the bearings of the shaft and the sides of the seed-box.

Fig. 3 is an enlarged view of the saw-toothed seed-distributing wheel N.

What I claim as my invention, and desire to secure by Letters Patent, is—

The arrangement of the frame R, seed-box A, wheels B, handles H, bottom c c, cog-wheels P P, the saw-toothed distributing-wheel N, the toothed cylinder S, the plow C, and the coverer O, operating conjointly as described, for the purpose specified.

CURRAN BATTLE.

Witnesses:
 WM. B. SHIVERS,
 ROBERT W. HUBERT.